United States Patent
Nakajima et al.

(10) Patent No.: US 12,214,842 B2
(45) Date of Patent: Feb. 4, 2025

(54) VEHICLE

(71) Applicant: Kawasaki Motors, Ltd., Akashi (JP)

(72) Inventors: Takeshi Nakajima, Akashi (JP); Hiroshi Ishii, Akashi (JP); Taro Iwamoto, Akashi (JP); Kazuya Nagasaka, Akashi (JP); Taichi Inaba, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 10 days.

(21) Appl. No.: 17/757,978

(22) PCT Filed: Dec. 9, 2020

(86) PCT No.: PCT/JP2020/045864
§ 371 (c)(1),
(2) Date: Jun. 24, 2022

(87) PCT Pub. No.: WO2021/131704
PCT Pub. Date: Jul. 1, 2021

(65) Prior Publication Data
US 2023/0027237 A1 Jan. 26, 2023

(30) Foreign Application Priority Data
Dec. 26, 2019 (JP) .................. 2019-236736

(51) Int. Cl.
*B62K 5/10* (2013.01)
*B62K 5/027* (2013.01)
(Continued)

(52) U.S. Cl.
CPC ................ *B62K 5/10* (2013.01); *B62K 5/027* (2013.01); *B62K 5/05* (2013.01); *B62K 5/08* (2013.01)

(58) Field of Classification Search
CPC . B62K 5/027; B62K 5/08; B62K 5/10; B62K 5/05; B62K 21/005
See application file for complete search history.

(56) References Cited

U.S. PATENT DOCUMENTS

| 2004/0168870 A1* | 9/2004 | Handke | B60G 15/068 |
| | | | 188/321.11 |
| 2008/0202827 A1* | 8/2008 | Thiers | B62K 25/14 |
| | | | 180/6.24 |

(Continued)

FOREIGN PATENT DOCUMENTS

| EP | 1199244 A1 * | 4/2002 | ............... B62D 1/16 |
| EP | 3581476 | 12/2019 | |

(Continued)

*Primary Examiner* — Paul N Dickson
*Assistant Examiner* — Matthew D Lee
(74) *Attorney, Agent, or Firm* — Fay Kaplun & Marcin, LLP (57) ABSTRACT

A leaning vehicle includes a vehicle body, a left front wheel, a right front wheel, a steering rod, suspension, a first steering part, second steering part, a pantograph mechanism. The first steering part is disposed a vehicle body side respect to the suspension and transmits rotational a steering force by a driver. The second steering part is disposed the front wheel side respect to the suspension and transmits the rotational steering force to the steering rod. The pantograph mechanism is disposed separately from the suspension, transmits the rotational steering force from the first steering part to the second steering part, and maintains state of transmission of the rotational steering force by deforming in accordance with changes in relative positions of the first steering part and the second steering part.

17 Claims, 9 Drawing Sheets (51) Int. Cl.
*B62K 5/05* (2013.01)
*B62K 5/08* (2006.01)

(56) References Cited

U.S. PATENT DOCUMENTS

| | | | | |
|---|---|---|---|---|
| 2015/0137472 | A1* | 5/2015 | Katoh | B62K 5/01 |
| | | | | 280/124.103 |
| 2015/0175200 | A1* | 6/2015 | Seibert | B62D 7/16 |
| | | | | 280/93.51 |
| 2015/0307153 | A1* | 10/2015 | Loni | B62K 21/20 |
| | | | | 280/276 |
| 2017/0088223 | A1* | 3/2017 | Hirakawa | B62K 5/08 |
| 2019/0283836 | A1* | 9/2019 | Boulton | B62K 21/04 |
| 2019/0382069 | A1* | 12/2019 | Nagasaka | B62K 5/027 |
| 2020/0189682 | A1* | 6/2020 | Ko | B62K 21/22 |
| 2020/0324598 | A1* | 10/2020 | Wagner | B60G 3/265 |
| 2021/0331762 | A1* | 10/2021 | Mighell | B62K 5/08 |
| 2022/0177065 | A1* | 6/2022 | Ohno | B62K 5/10 |
| 2023/0294766 | A1* | 9/2023 | Doerksen | B62D 6/00 |
| | | | | 280/124.103 |

FOREIGN PATENT DOCUMENTS

| | | | | |
|---|---|---|---|---|
| JP | S63149279 | | 6/1988 | |
| JP | 2017065531 | | 4/2017 | |
| JP | 2018052332 | | 4/2018 | |
| JP | 2019214300 | | 12/2019 | |
| WO | WO-2014046282 A1 * | 3/2014 | ........... B60G 17/005 |
| WO | 20170629960 | | 4/2017 | |
| WO | WO-2020065577 A1 * | 4/2020 | ............ B62K 21/20 |

\* cited by examiner

VEHICLE

PRIORITY DATA

The present application is a 371 application of PCT Patent Application Serial No. PCT/JP2020/0045864 filed on Dec. 9, 2020 which claims priority to Japanese Patent Application Serial No. 2019-236736 filed on Dec. 26, 2019. The disclosure of the above applications is incorporated herein by reference.

TECHNICAL FIELD

The present invention relates mainly to a vehicle having two front wheels.

BACKGROUND ART

Patent Literature 1 (PTL 1) discloses a leaning vehicle including a first steering shaft and a second steering shaft. The first steering shaft is attached to a handle operated by a driver. The steering shaft and the handle rotate integrally. The first steering shaft and the second steering shaft are connected, and steering force is transmitted from the first steering shaft to the second steering shaft.

CITATION LIST

Patent Literature

PTL 1: Japanese Patent Application Laid-Open No. 2018-052332

SUMMARY OF INVENTION

In the leaning vehicle of PTL 1, both the first steering shaft and the second steering shaft are attached to a vehicle body side respect to a suspension. Thus, the first steering shaft and the second steering shaft move integrally up and down even if the suspension expands or retracts in accordance with unevenness of a road surface. However, if the second steering shaft is attached to the front wheel side respect to the suspension, it is required that a configuration can transmit the steering force and corresponds the expansion and retraction of the suspension.

The present invention relates to a vehicle being able to transmit rotational steering force between a vehicle body side and a front wheel side respect to a suspension.

Solution to Problem

The problem to be solved by the present invention is as above. The following describes solutions to the problem as well as advantageous effects thereof.

An aspect of the present invention provides a vehicle having the following configuration. The vehicle includes a vehicle body, a first front wheel, a second front wheel, a steering rod, a suspension, a first steering part, a second steering part, and deformation transmitter. The first front wheel is positioned on a first side in a vehicle width direction. The second front wheel is positioned on a second side opposite to the first side in the vehicle width direction. The steering rod, in response to receiving a rotational steering force, pushes and pulls the first front wheel and the second front wheel in the vehicle width direction, to change an actual steering angle. The suspension connects front wheel side to the vehicle body side and reduces vibration transmitted from a road surface to the vehicle body via the first front wheel or the second front wheel. The first steering part is disposed the vehicle body side respect to the suspension and transmits rotational steering force by a driver. The second steering part is disposed the front wheel side respect to the suspension and transmits the rotational steering force to the steering rod. The deformation transmitter is disposed separately from the suspension, transmits the rotational steering force from the first steering part to the second steering part, and maintains state of transmission of the rotational steering force by deforming in accordance with changes in relative positions of the first steering part and the second steering part.

Accordingly, rotational steering force can be transmitted between a vehicle body side and a front wheel side respect to a suspension.

Advantageous Effects of Invention

According to the present invention, one of the advantages is that a rotational steering force can be transmitted between a vehicle body side and a front wheel side respect to a suspension.

DETAILED DESCRIPTION

Description of Embodiments

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load.

Figure 1:
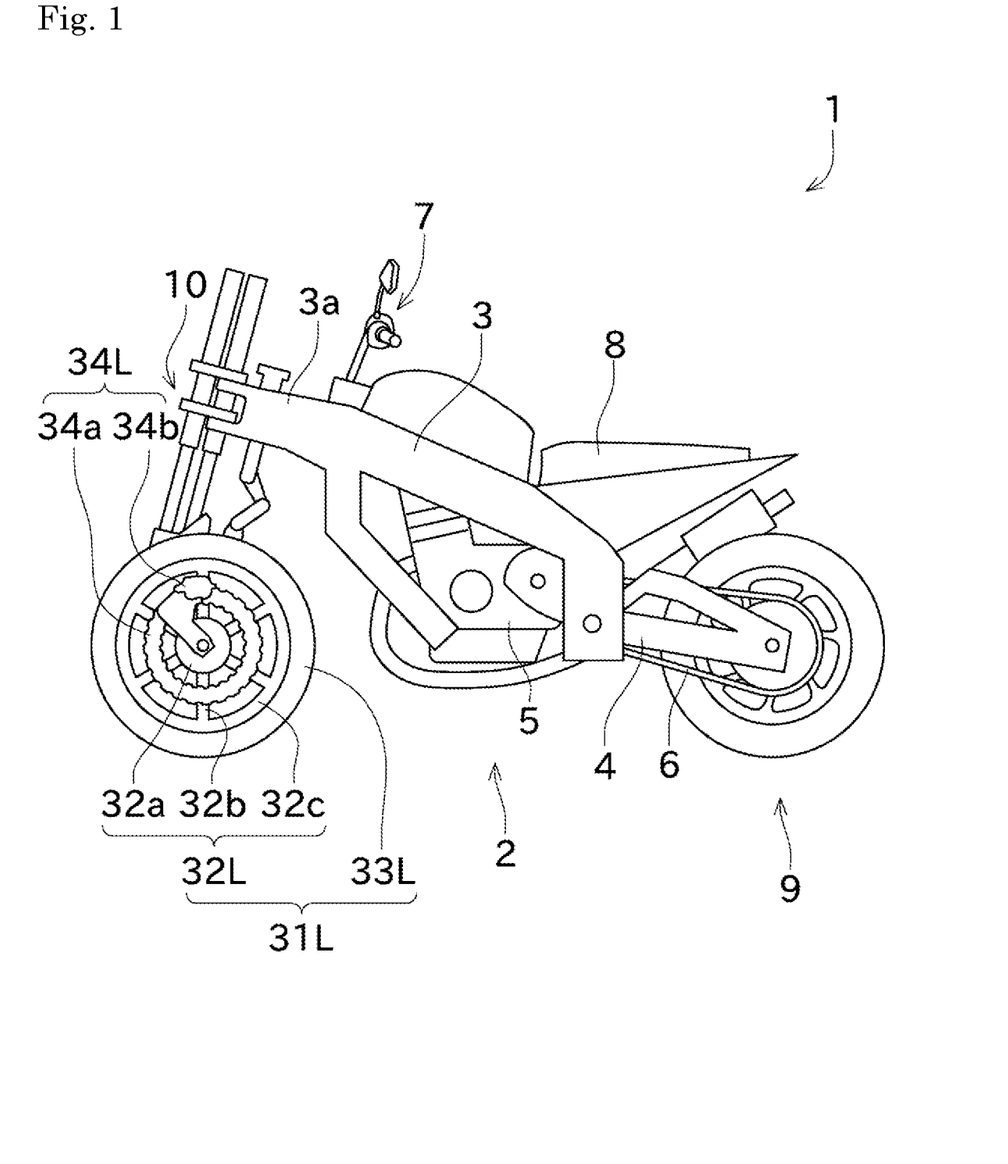
FIG. 1 shows a side view of a leaning vehicle according to a first embodiment of the present invention.
Figure 2:
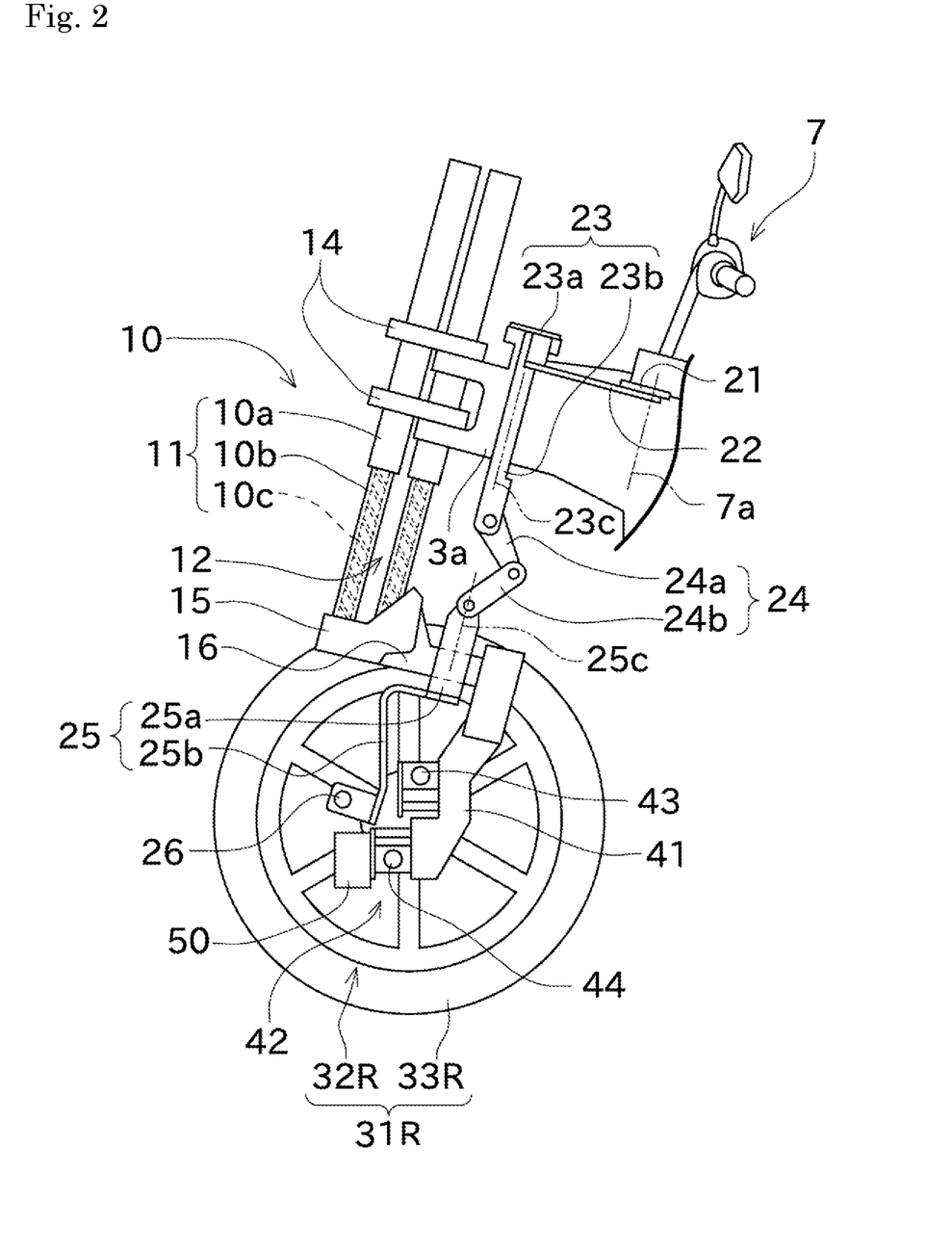
FIG. 2 shows a side view of a front portion of the leaning vehicle.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3. Details of how the left front wheel 31L and the right front wheel 31R are attached will be given later.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 3:
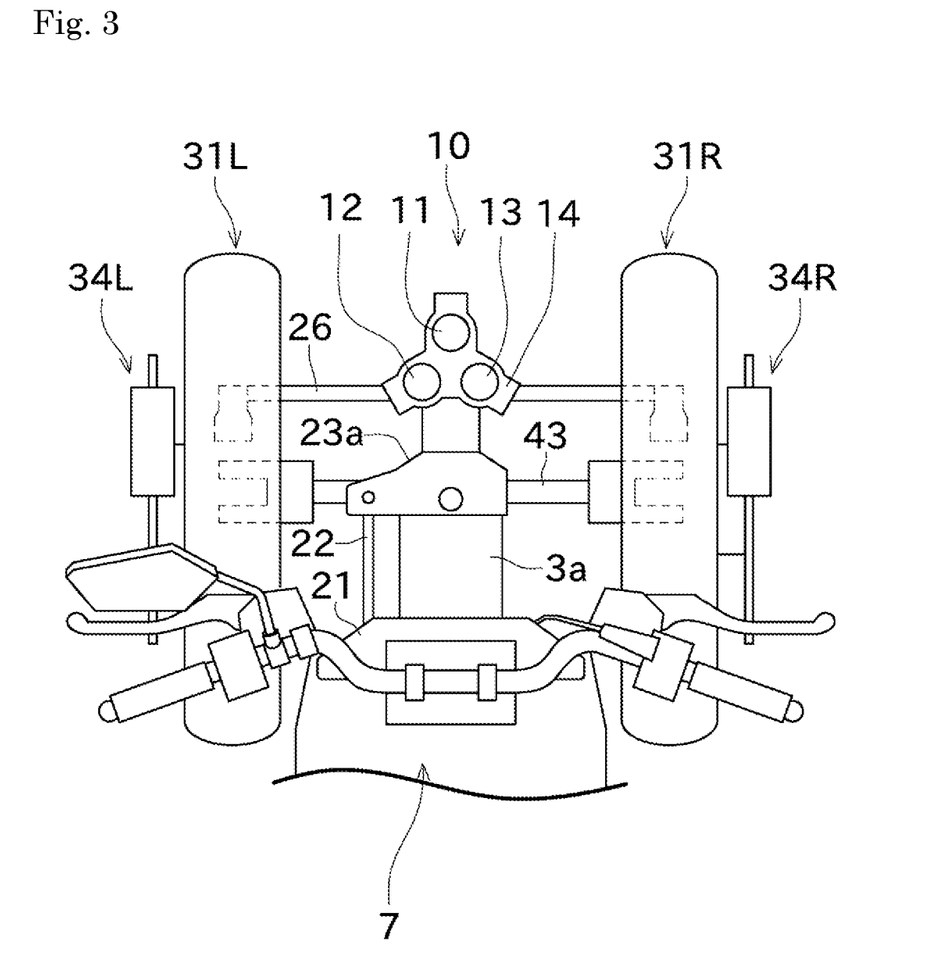
FIG. 3 shows a plan view of the front portion of the leaning vehicle.

A front suspension 10 included in the leaning vehicle 1 will now be described with reference to FIG. 2 and FIG. 3.

The suspension 10 couples the vehicle body 2 to the left front wheel 31L and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. In the description below, a member attached on the side close to the left front wheel 31L and the right front wheel 31R (the side where vibrations occur) relative to the suspension 10 will be referred to as "vibration side member". A member attached on the side close to the vehicle body 2 (the side where vibration damping is made) relative to the suspension 10 will be referred to as "vibration-damping side member".

The suspension 10 includes a first tubular suspension 11, a second tubular suspension 12, and a third tubular suspension 13. In the following, the first tubular suspension 11, the second tubular suspension 12, and the third tubular suspension 13 will be collectively called "tubular suspensions 11, 12, and 13". The tubular suspensions 11, 12, and 13 have the same configuration. The configurations of the tubular suspensions 11, 12, and 13 are identical to the configuration of a front fork that is generally adopted in a motorcycle. The suspension 10 is not limited to a front fork type.

Each of the tubular suspensions 11, 12, and 13 includes a tubular body 10a, a sliding body 10b, and a spring 10c.

The tubular body (outer tube) 10a is an elongated tubular member. The tubular body 10a has the sliding body (inner tube) 10b received therein. The sliding body 10b is an elongated tubular member having a diameter smaller than that of the tubular body 10a. The sliding body 10b is capable of moving along its longitudinal direction relative to the tubular body 10a. The sliding body 10b has the spring 10c received therein. The tubular body 10a and the sliding body 10b are connected via the spring 10c. With this configuration, vibrations transmitted from the sliding body 10b to the tubular body 10a can be reduced. Oil is encapsulated in the suspension 10, and a movement of the sliding body 10b relative to the tubular body 10a causes a movement of the oil. The movement of the oil produces a resistance force (damping force), which can damp the vibrations in a short time.

In this embodiment, the tubular body 10a is disposed more upward than the sliding body 10b, and basically, the above-mentioned "vibration-damping side member" vibrates integrally with the tubular body 10a. The sliding body 10b is disposed more downward than the tubular body 10a. Basically, the above-mentioned "vibration side member" vibrates integrally with the sliding body 10b. Which one of the tubular body 10a and the sliding body 10b is disposed more upward or more downward than the other may be reversed.

The respective sliding bodies 10b of the tubular suspensions 11, 12, and 13 are configured to slide integrally. To be specific, the suspension 10 includes an upper coupling member 14 and a lower coupling member 15.

The upper coupling member 14 couples the respective tubular bodies 10a of the tubular suspensions 11, 12, and 13. This makes it impossible for the respective tubular bodies 10a of the tubular suspensions 11, 12, and 13 to move relative to one another, and thus the tubular bodies 10a can be integrated. At least one of the tubular bodies 10a of the tubular suspensions 11, 12, and 13 is attached to a front frame 3a disposed in a front portion of the vehicle body frame 3.

The lower coupling member 15 couples the respective sliding bodies 10b of the tubular suspensions 11, 12, and 13. This makes it impossible for the respective sliding bodies 10b of the tubular suspensions 11, 12, and 13 to move relative to one another, and thus allows the sliding bodies 10b to slide integrally. At least one of the sliding bodies 10b of the tubular suspensions 11, 12, and 13 is attached to a lower coupling base 16. The left front wheel 31L and the right front wheel 31R are attached to the lower coupling base 16 via the later-described mechanism.

Outline of the front wheel will now be described with reference to FIG. 1 and FIG. 2.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake 34R, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc 34a, which is attached to the left wheel 32L, into a brake caliper 34b. It may be also acceptable that the left brake 34L is attached more inward than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Attached to the left wheel 32L is a left arm 45 as a left knuckle member. An outer end portion of the above-mentioned steering rod 26 in the vehicle width direction is rotatably attached to the left arm 45. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified.

A mechanism for transmitting a rotational steering force applied by the driver will now be described with reference to FIG. 2 and FIG. 5.

Disposed below the steering handle 7 is a rear bracket 21. The steering handle 7 and the rear bracket 21 are coupled by a fixture, for example. The steering handle 7 and the rear bracket 21 are integrally rotatable about a steering rotation axis 7a (a line substantially parallel to the upper-lower direction). A rotation angle of the steering handle 7 about the steering rotation axis 7a may sometimes be referred to as maneuvering angle.

The rear end of a transmission arm (rotation transmission part) 22 is rotatably attached to the rear bracket 21. The transmission arm 22 connects the rear bracket 21 to a first steering part 23. The transmission arm 22 transmits a rotational steering force applied to the steering handle 7 to the first steering part 23.

The first steering part 23 is disposed more frontward than the rear bracket 21 and the steering handle 7. The first steering part 23 is disposed so as to overlap the center in the vehicle width direction. The first steering part 23 is rotatably attached to the front frame 3a.

The first steering part 23 includes a front bracket 23a and a pantograph attachment part 23b. The front bracket 23a and the pantograph attachment part 23b are connected by a fixture, for example. The front bracket 23a and the pantograph attachment part 23b are integrally rotatable about a first rotation axis 23c (a line substantially parallel to the upper-lower direction). A front end of the transmission arm 22 is attached to the front bracket 23a. This configuration allows the first steering part 23 to rotate as the steering handle 7 and the rear bracket 21 rotate. In this embodiment, the transmission arm 22 is provided only on the first side, the transmission arm 22 may be provided on both sides in the vehicle width direction.

The pantograph attachment part 23b has a pair of left and right elongated arms which extend along the first rotation axis 23c. The arms are positioned at an interval from the front frame 3a and sandwich the front frame 3a in the vehicle width direction. This allows the pantograph attachment part 23b to rotate without interfering with the front frame 3a. The pantograph attachment part 23a includes a portion that is positioned lower than the front frame 3a, is connected to the left and right arms, and overlaps the center of the vehicle in the vehicle width direction. Attached to the portion is a pantograph mechanism (a deformation transmitter) 24.

The pantograph mechanism 24 is positioned so as to overlap the center in the vehicle width direction. The pantograph mechanism 24 includes a first link portion 24a and a second link portion 24b. The first link portion 24a is attached to the first steering part 23 (specifically, pantograph attachment part 23b) so as to be rotatable about the vehicle width direction. The second link portion 24b is attached to a later-described second steering part 25 so as to be rotatable about the vehicle width direction. The second steering part 25 is a "vibration side member". The first link portion 24a and the second link portion 24b are coupled to each other so as to be rotatable about the vehicle width direction.

With the configuration described above, the first steering part 23 and the second steering part 25 can be kept coupled even if a relative distance between the first steering part 23 and the second steering part 25 is changed. Accordingly, transmission of the rotational steering force remains enabled even though the suspension 10 expands or retracts because of, for example, unevenness of the road surface.

The suspension 10 is disposed nearly in front of the pantograph mechanism 24. Thus, when the pantograph mechanism 24 is in operation, it is necessary that the first link portion 24a or the second link portion 24b should not collide with the suspension 10. In this regard, in this embodiment, a connection point of the first link portion 24a and the second link portion 24b is positioned rearward than the first rotation axis 23c. That is, the pantograph mechanism 24 protrudes rearward (i.e., on the opposite side of the suspension 10) when a relative distance of the first steering part 23 and the second steering part 25 becomes short. Therefore, the collision does not occur when the pantograph mechanism 24 approaches the suspension 10.

The first link portion 24a may consist of one member or two members disposed in the vehicle width direction (that is the same as the second link portion 24b). The pantograph mechanism 24 of this embodiment consists of two links, but may consist of three or more links. The links may be plate-shaped, rod-shaped, or block-shaped as long as it can be transmit power. Instead of the pantograph mechanism, other mechanisms (for example, a mechanism in which a first member slides with respect to a second member)

The second steering part 25 is positioned so as to overlap the center in the vehicle width direction. The second steering part 25 transmits a rotational steering force received via the pantograph mechanism 24 to the steering rod 26. The second steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The second steering part 25 rotates in accordance with steering, while the lower coupling base 16 does not rotate in accordance with steering. Accordingly, the second steering part 25 is attached so as to be rotatable relative to the lower coupling base 16.

Figure 4:
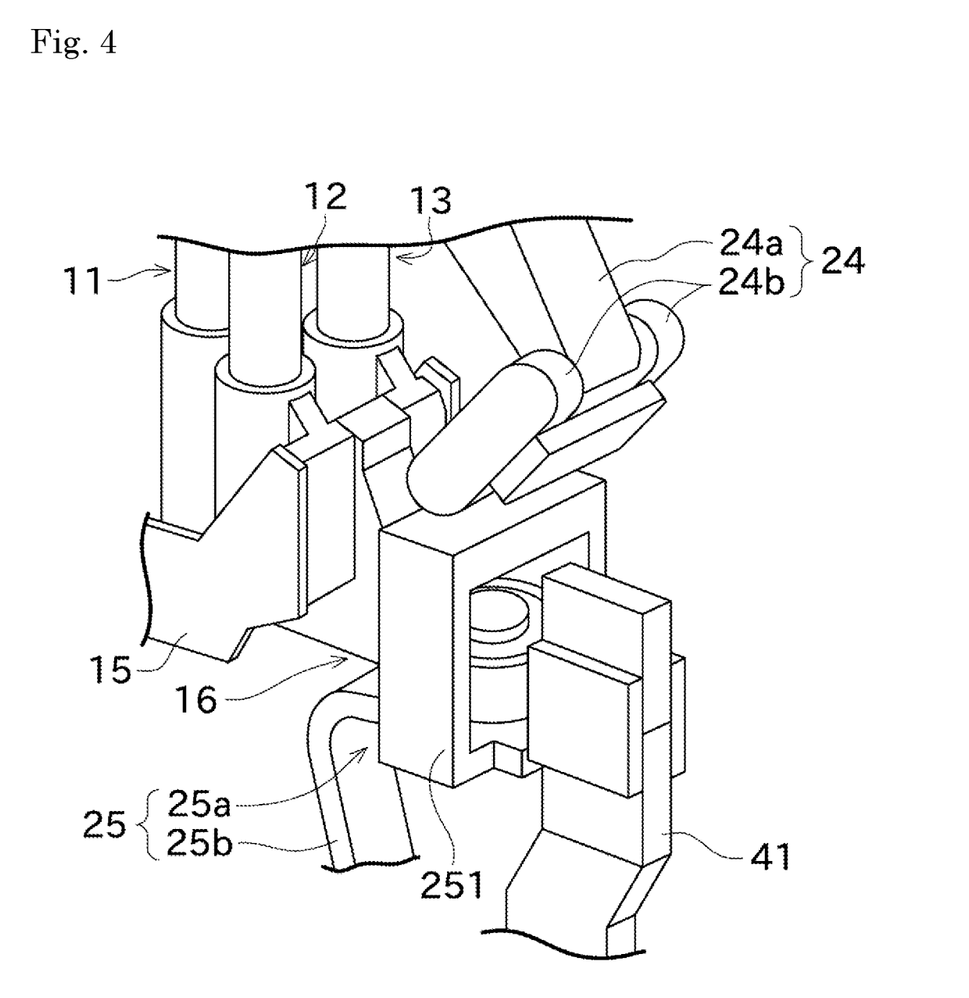
FIG. 4 shows an enlarged perspective view of a suspension, a pantograph mechanism, and a can base.

The suspension attaching portion 25a and the lower coupling base 16 are disposed so as to intersect each other in the side view. Specifically, as shown in FIG. 4, the suspension attaching portion 25a includes a frame member 251 that is rectangular-shaped and frame-shaped. A part of the lower coupling base 16 is positioned in a center space of the frame member 251, and the frame member 251 is rotatably attached to the lower coupling base 16. Since both the lower coupling base 16 and the suspension attaching portion 25a are positioned so as to overlap the center in the vehicle width direction, it is necessary to prevent interference between their positions of both parts. In this regard, in this embodiment, a configuration in which the lower coupling base 16 passes through the frame member 251 prevents interference of both parts.

The rod attaching portion 25b is attached to a lower portion of the suspension attaching portion 25a. The rod attaching portion 25b has a substantially L-like shape including a portion that extends frontward from the suspension attaching portion 25a and a portion that extends downward. With this configuration, a space can be formed below the suspension attaching portion 25a. In this space, a part of the later-described lean mechanism 42 is disposed.

The suspension attaching portion 25a and the rod attaching portion 25b are connected by a fixture or the like and integrally rotatable. In other words, the second steering part 25 is integrally rotatable about a second rotation axis 25 as shown in FIG. 2 (a line substantially parallel to the upper-lower direction).

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more frontward than the axle). The right end of the steering rod 26 is attached to the right front wheel 31R (more specifically, to a portion of the right front wheel 31R more frontward than the axle). A rotational steering force applied by the driver causes the rod attaching portion 25b to rotate about the second rotation axis 25c, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

In this embodiment, the first rotation axis 23c and the second rotation axis 25c are coincident. Accordingly, a distance of the maneuvering angle (a rotation angle of the steering handle 7) and the actual steering angle (a rotation angle of the left front wheel 31L and the right front wheel 31R) is hardly generated. Therefore, operability of a driver can be high.

The smaller angle of angles between the first rotation axis 23c and the upper-lower direction is a caster angle. The caster angle affects the traveling or operating of the leaning vehicle 1. Thus, the caster angle is adopted according to the application or purpose of the leaning vehicle 1. The leaning vehicle 1 of this embodiment employs a relatively small caster angle. In this embodiment, since the left front wheel 31L/the right front wheel 31R and the steering handle 7 are relatively far apart in the front-rear direction, the caster angle tends to be large. However, by transmitting the rotational steering force via the first steering part 23, the caster angle can be small without changing positions of the left front wheel 31L/the right front wheel 31R and the steering handle 7. The first steering part 23 may be omitted.

The steering rod 26 includes a mechanism for adjusting a toe angle. The toe angle is an angle formed by the left front wheel 31L and the front-rear direction or the right front wheel 31R and the front-rear direction in the plan view when the maneuvering angle is neutral. For example, toe-in is a state in which the distance between the front ends of the left front wheel 31L and the right front wheel 31R is shorter than the distance between their rear ends in the plan view. Toe-out is a state in which the distance between the front ends of the left front wheel 31L and right front wheel 31R is longer than the distance between their rear ends in the plan view.

Figure 5:
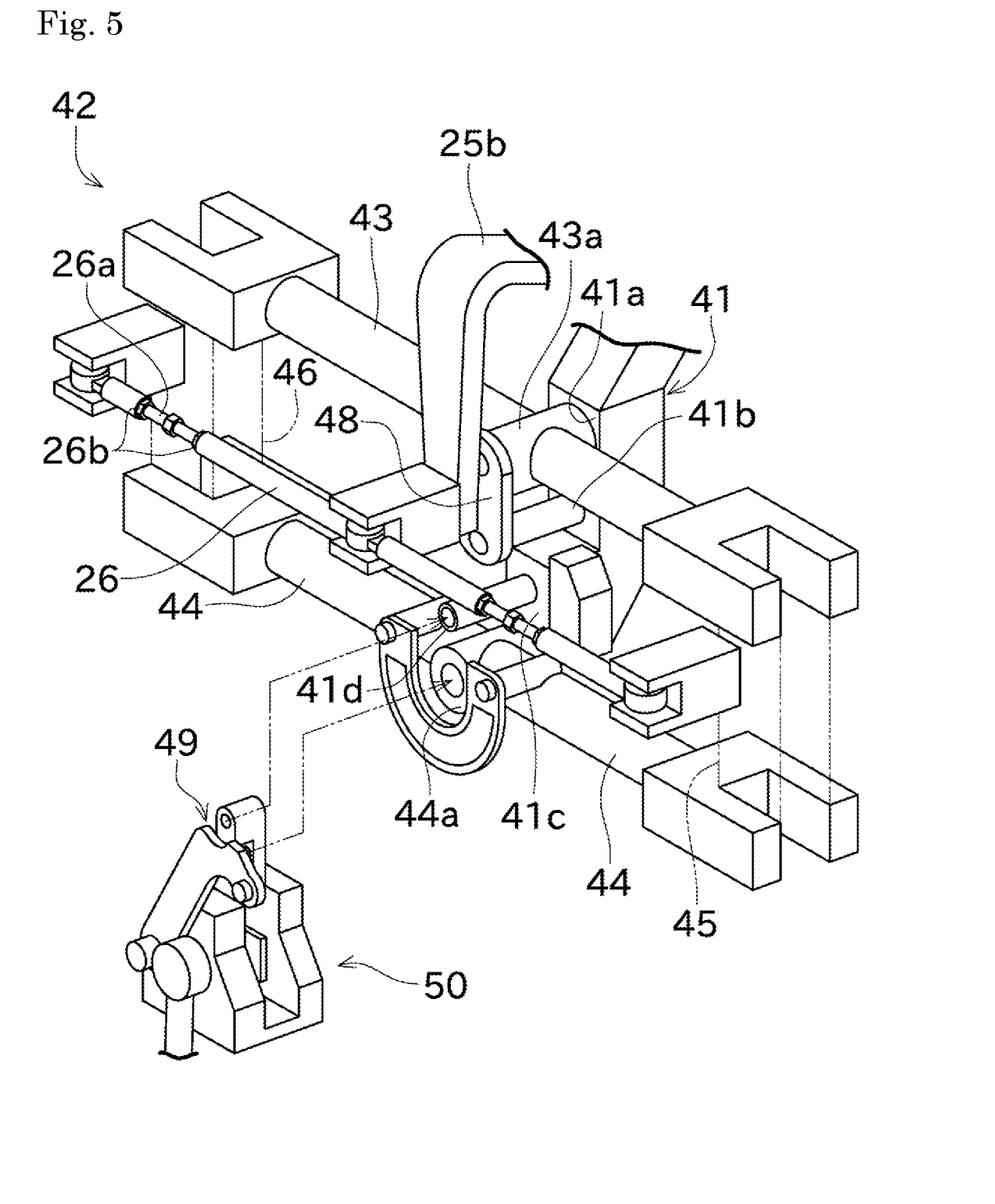
FIG. 5 shows perspective view of a lean mechanism.

As shown in FIG. 5, the steering rod 26 includes a threaded shaft 26a and an adjusting nut 26b. The adjusting nut 26b is attached to the threaded shaft 26a. By rotating the adjusting nut 26b with respect to the threaded shaft 26a and moving along the axial direction, the length of the steering rod 26 can be changed. Since the steering rod 26 is positioned at forward of the axle, shortening the length of the steering rod 26 results in toe-in, and longing the length of the steering rod 26 results in toe-out. In order to adjust the toe angle of the leaning vehicle 1 into exactly 0 degree, the length of the steering rod 26 can be changed.

In particular, the steering rod 26 of this embodiment has an adjusting mechanism (threaded shaft 26a and adjusting nut 26b) at left side and right side with respect to the center in the vehicle width direction. Therefore, the toe angles of the left front wheel 31L and the right front wheel 31R can be adjusted individually.

Figure 6:
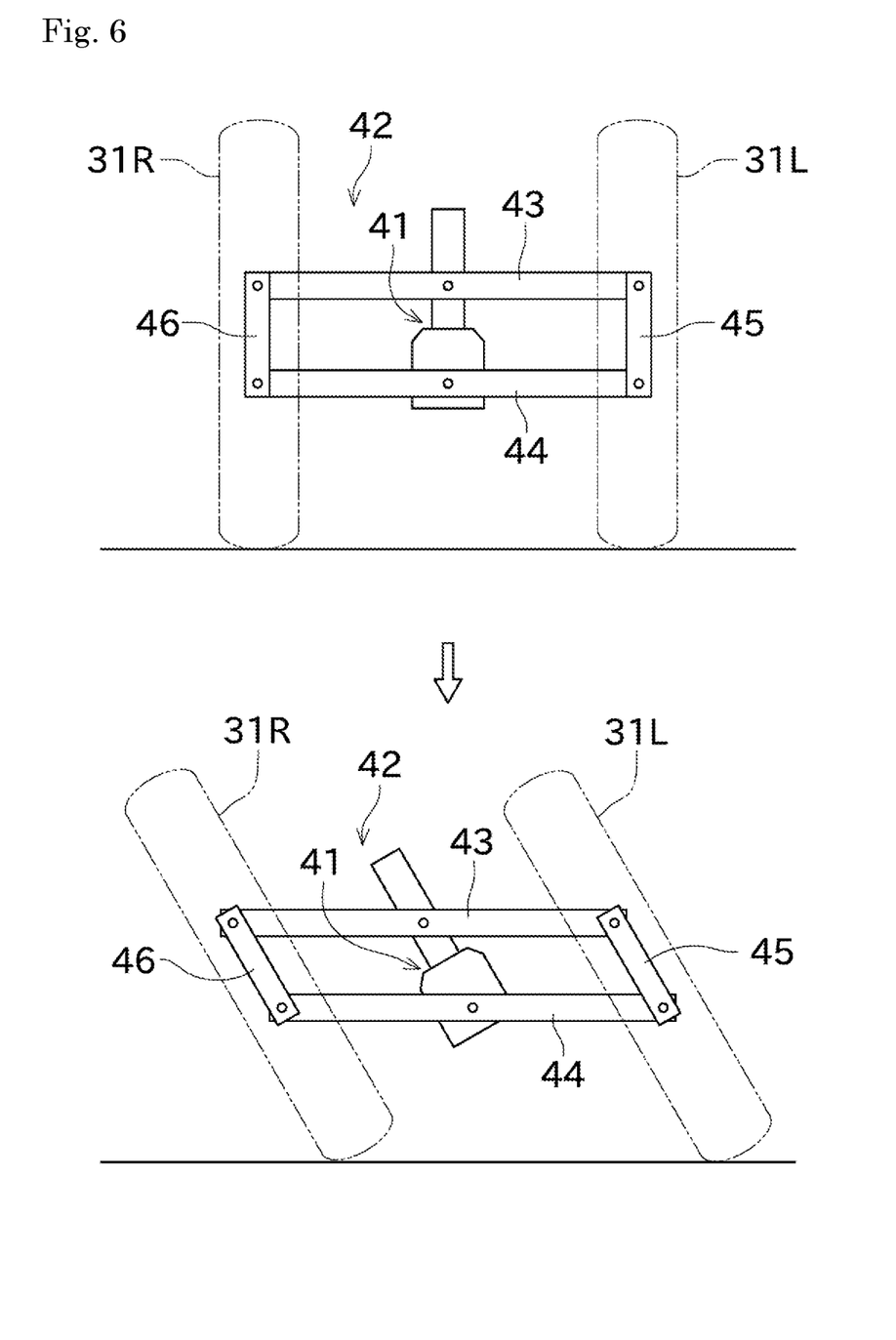
FIG. 6 shows a schematic front view illustrating a leaning operation.

A lean mechanism 42 will now be described with reference to FIG. 5 and FIG. 6.

In the description of the lean mechanism 42, being rotatably attached means being attached so as to be capable of relative rotation about the front-rear direction.

Attached to a rear portion of the lower coupling base 16 is a lean base 41 extending downward from the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 and the lean mechanism 42, which are attached to the lower coupling base 16, are "vibration side members". The lean base 41 and the lean mechanism 42 are arranged at a relatively low position (a position where they are partially or entirely overlap the left front wheel 31L in a side view). With this, heavy parts can be arranged at a low position, and therefore the leaning vehicle 1 can be stabilized.

The lean base 41 includes an upper attaching portion 41a and a lower attaching portion 41c. The upper attaching portion 41a and the lower attaching portion 41c are formed on surfaces on the front side (one side in the front-rear direction, hereinafter the same). The upper attaching portion 41a is disposed more upward and more rearward than the lower attaching portion 41c. The upper attaching portion 41a has an upper protruding tube 41b protruding frontward. The lower attaching portion 41c has a lower protruding tube 41d protruding frontward. Here, it should be noted that the lean base 41 may have a configuration other than the first embodiment, as illustrated in a second embodiment which will be described later.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a. The upper fulcrum portion 43a has the front end to which a coupling link 48 is rotatably attached. The coupling link 48 is rotatably attached not only to the front end of the upper fulcrum portion 43a but also to the front end of the upper protruding tube 41b. As a result, the upper arm 43 can be supported in a manner of being sandwiched between the lean base 41 and the coupling link 48 in the front-rear direction, so that the upper arm 43 can be supported more stably as compared to cantilevered supporting. The upper protruding tube 41b and the coupling link 48 may be omitted.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c. The lower fulcrum portion 44a has the front end to which a lean bracket 49 is rotatably attached. The lean bracket 49 is rotatably attached not only to the front end of the lower fulcrum portion 44a but also to the front end of the lower protruding tube 41d. As a result, the lower arm 44 can be supported in a manner of being sandwiched between the lean base 41 and the lean bracket 49 in the front-rear direction, so that the lower arm 44 can be supported more stably as compared to cantilevered supporting.

The lean bracket 49 of this embodiment has a function for attaching not only the lower arm 44 but also another mechanism involved in leaning (e.g., a part of a lean brake mechanism 50) to the lean base 41. The lean brake mechanism 50 is a mechanism for braking a leaning operation. The lean brake means generating a resistance force on the leaning operation to make the leaning operation less likely to occur or to reduce the lean angle. The lean bracket 49 may be a member (a member like the coupling link 48) for attaching the lower arm 44 alone.

Both the upper protruding tube 41b and the lower protruding tube 41d are positioned more downward than the upper arm 43 and more upward than the lower arm 44. This allows the lean mechanism 42 to have a reduced size in the upper-lower direction as compared to a configuration having the upper protruding tube 41b disposed more upward than the upper attaching portion 41a, for example.

The left arm 45 is rotatably attached to the left wheel 32L. To be specific, the left arm 45 is attached to the hub 32a of the left wheel 32L. The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 6. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

A layout of the tubular suspensions 11, 12, 13 will now be described with reference to FIG. 7.

The tubular suspensions 11, 12, 13 is positioned at an space in front of an axle center (an axle position, a hub hole position) of the left front wheel 31L and the right front wheel 31R. It is necessary that the tubular suspensions 11, 12, 13 is disposed so as to prevent from an interference with the left front wheel 31L and the right front wheel 31R even if the actual steering angle of the left front wheel 31L and the right front wheel 31R changes.

Figure 7:
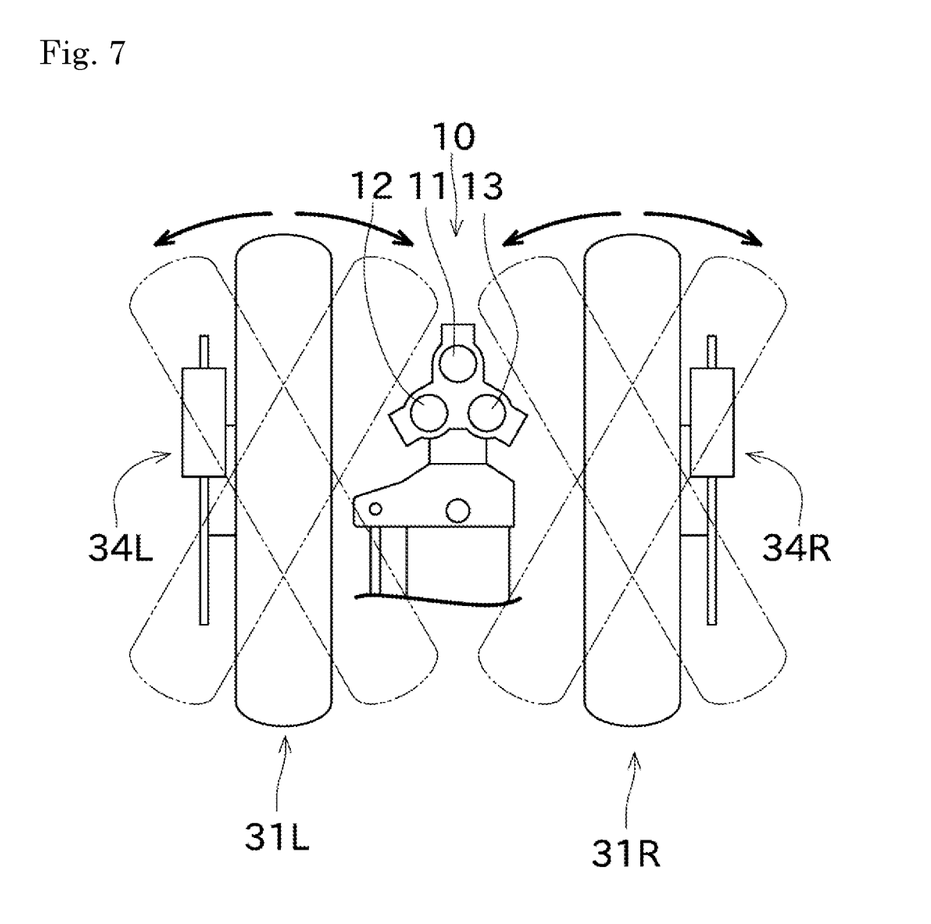
FIG. 7 shows view illustrating a positional relationship of a movable range of the front wheels and the suspension.

FIG. 7 shows the left front wheel 31L and the right front wheel 31R by chain lines in a situation where the actual steering angle of left and right is the maximum angle. The maximum angle of the actual steering angle will now be described. When the steering handle 7 is rotated, the steering handle 7 or a member that rotates integrally with it contacts another member, preventing the steering handle 7 from rotating any further. The actual steering angles of the left front wheel 31L and the right front wheel 31R in this state are the "maximum angle of the actual steering angle".

Thus, as shown in FIG. 7, the space in which tubular suspensions 11, 12, 13 can be placed in the front gets smaller in size in the vehicle width direction as it gets closer.

Thus, the tubular suspensions 11, 12, 13 of this embodiment are disposed as follows. That is, the first tubular suspension 11 is positioned at the first row, in other words the front end. The first tubular suspension 11 is positioned so as to overlap the center in the vehicle width direction. The second tubular suspension 12 and the third tubular suspension 13 are positioned at the second row that is rear of the first row The second tubular suspension 12 and the third tubular suspension 13 are symmetric the center in the vehicle width direction.

Accordingly, the tubular suspension 11, 12, 13 can be efficiently disposed so as to prevent from the interference with the left front wheel 31L and the right front wheel 31R. The layout may be different from that of this embodiment as long as the interference with the left front wheel 31L and the right front wheel 31R. For example, the layout may have two tubular suspensions located in the first row and one tubular suspension located in the second row.

If the tubular suspensions 11, 12, 13 are disposed in a single row, they would be highly resistant to forces applied in one particular direction, but weakly resistant to forces applied in other directions. Thus, it is preferable that the tubular suspension 11, 12, 13 are not disposed in a single row. For example, by differentiating a row direction of the first tubular suspension 11 and the second tubular suspension 12 from a row direction of the first tubular suspension 11 and the third tubular suspension 13, the tubular suspensions 11, 12, 13 are not disposed in a single row.

The tubular suspensions may be disposed in a single row if sufficient strength can be ensured. If there are two tubular suspensions, the tubular suspensions are necessarily disposed in a single row. The number of tubular suspensions may be four or more.

A relationship between the suspension 10 and the lean mechanism 42 will now be described.

As described above, the left front wheel 31L and the right front wheel 31R are attached to the lean mechanism 42 corresponding to the first mechanism. The lean mechanism 42 are attached to the lower coupling base 16 of the suspension 10 via the lean base 41. Thus, a shock-absorbing mechanism of the suspension 10 of this embodiment is not individually disposed on the left and right. That is, the suspension 10 absorbs vibrations transmitted from the left front wheel 31L and the right front wheel 31R collectively.

If the shock-absorbing mechanisms are disposed individually, a tubular suspension (front forks) is attached to a left and right front wheel, respectively. In this case, a size of a front portion of a leaning vehicle in the vehicle width direction is likely to be large. Depending on an attachment method of the tubular suspension, a configuration may be complicate or heavier.

On the other hand, in this embodiment, since the shock-absorbing mechanism are not individually disposed left and right, the suspension 10 can be disposed the center in the vehicle width direction only. Thus the size of the front portion of the leaning vehicle in the vehicle width direction 1 can be small. Moreover, It may also simplify the configuration and reduce weight. In general, in a configuration where the shock-absorbing mechanism is not individually on the left and right, there is a concern that not only the left front wheel but also the right front wheel may leave the road surface if, for example, only the left front wheel steps on a large stone. However, in this embodiment, the left front wheel 31L and the right front wheel 31R are connected to the lean mechanism 42, so the right front wheel 31R can remain in contact with the road surface in this situation.

In this embodiment, the left front wheel 31L and the right front wheel 31R are connected by the lean mechanism 42, and the lean mechanism 42 is attached to the suspension 10. Instead of this configuration, the left front wheel 31L and the right front wheel 31R may be connected by a member except the lean mechanism 42, the member may be attached to the suspension 10.

A configuration in which shock-absorbing mechanism is not disposed individually on left and right can be applied to other than front fork type suspensions. For example, the spring 10c may not built-in-type, and the spring 10c may be located outside of the tubular body 10a and the sliding body 10b. In this case, the spring 10c is connected to an appropriate mechanism so that the spring 10c extends and retracts in response to the relative movement (sliding) of the tubular body 10a and the sliding body 10b. Instead of a suspension with a configuration in which the sliding body 10b slides during shock-absorbing, a suspension with a configuration in which the arm moves up and down (rotates up and down) during shock-absorbing may be used.

Figure 8:
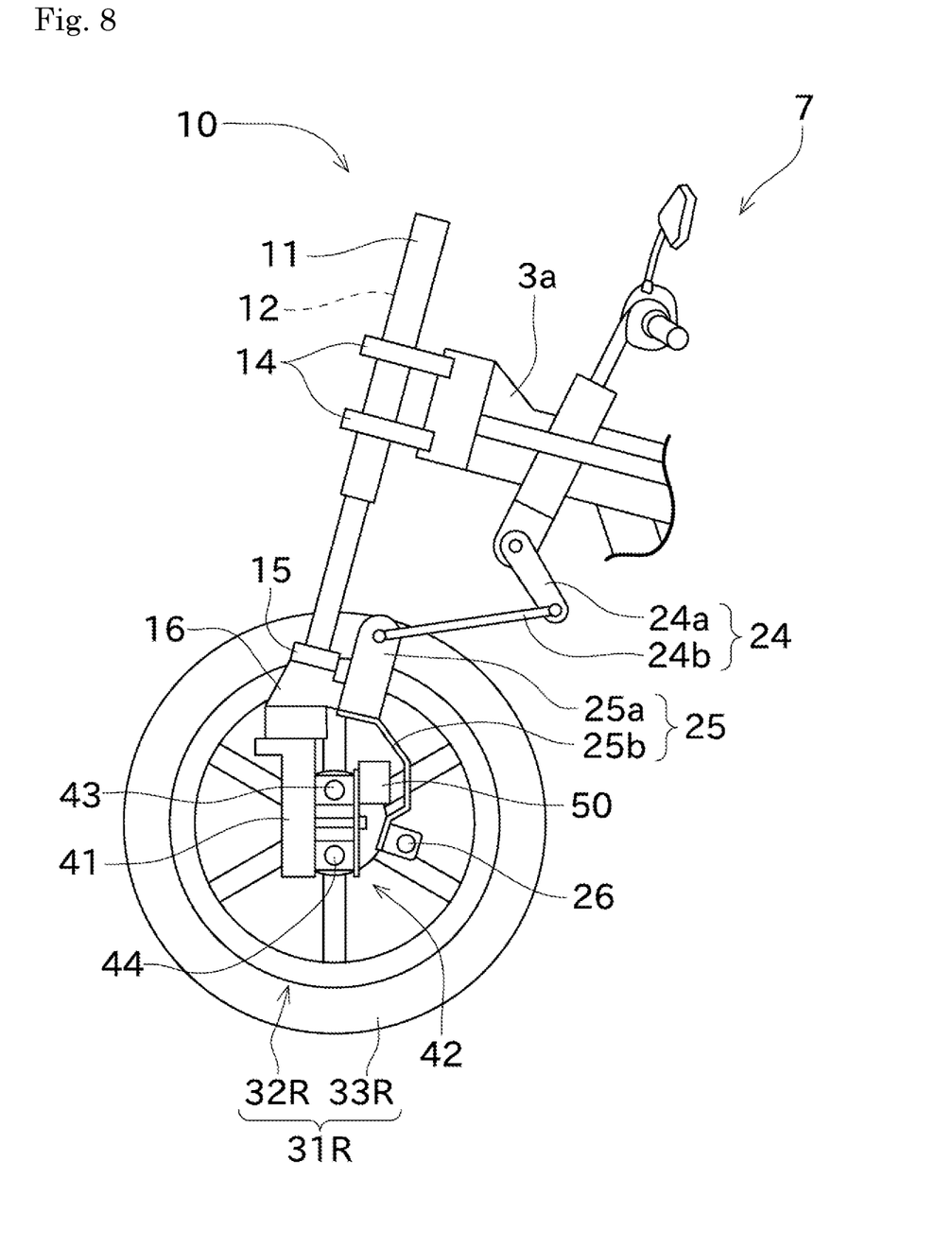
FIG. 8 shows side view of a front portion of a leaning vehicle according to a second embodiment.
Figure 9:
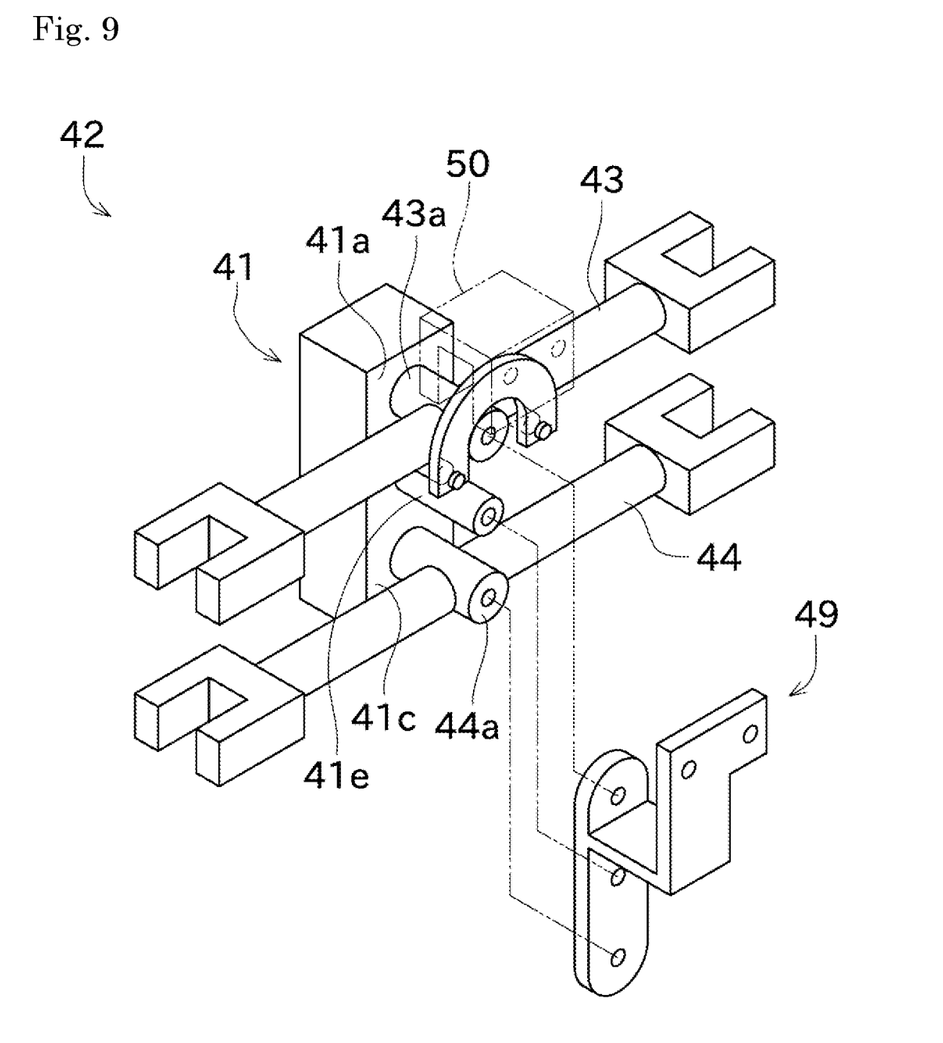
FIG. 9 shows perspective view of a lean mechanism according to the second embodiment.

A leaning vehicle 1 according to the second embodiment will now be described with reference to FIG. 8 and FIG. 9.

The description of the second embodiment will mainly deal with configurations different from the first embodiment. In the description of the second embodiment, members identical or similar to those of the first embodiment are given the same reference signs on the drawings, and their descriptions may be omitted or simplified.

The suspension 10 of the first embodiment includes the three tubular suspensions 11, 12, and 13. A suspension 10 of the second embodiment, on the other hand, includes two tubular suspensions 11 and 12. The first tubular suspension 11 and the second tubular suspension 12 are disposed side by side in the vehicle width direction.

In the first embodiment, the rotational steering force of the steering handle 7 is transmitted to the pantograph mechanism 24 via the first steering part 23. In the second embodiment, on the other hand, a rotational steering force of a steering handle 7 is directly transmitted to a pantograph mechanism 24. Thus, the pantograph mechanism 24 is attached to a member that rotates coaxially with the steering handle 7.

Thus, the rotation axis of the steering handle 7 and the rotation axis of the second steering part 25 is not same. Accordingly, a distance of the maneuvering angle (a rotation angle of the steering handle 7) and the actual steering angle (a rotation angle of the left front wheel 31L and the right front wheel 31R) is slightly generated. However, the configuration can be simplified by omitting the first steering part 23. The difference between the maneuvering angle and the actual steering angle is absorbed, for example, by elastic deformation of the pantograph mechanism 24. In particular, the second link portion 24b of the second embodiment is rod-shaped and easily deformable. The second link portion 24b may have a mechanism to adjust its length.

In the second embodiment, a lower coupling base 16 does not cross a second steering part 25, and a lean base 41 is positioned immediately below the lower coupling base 16. An upper arm 43 and a lower arm 44 are positioned more rearward than the lean base 41. With this, a steering rod 26 and a lean brake mechanism 50 are also positioned more rearward than the lean base 41. In this manner, arranging members involved in leaning and steering on one side (on the front side in the first embodiment, and on the rear side in the second embodiment) of the lean base 41 allows the members involved in leaning and steering to be arranged collectively. As shown in FIG. 9, a structure for attaching the upper arm 43 and the lower arm 44 is also different from that of the first embodiment. In the first embodiment, the upper attaching portion 41a and the lower attaching portion 41c of the lean base 41 are at different positions in the front-rear direction. In the second embodiment, an upper attaching portion 41a and a lower attaching portion 41c are at the same position in the front-rear direction. Accordingly, the upper arm 43 and the lower arm 44 are at the same position in the front-rear direction.

Although in the first embodiment, the lean base 41 has the upper protruding tube 41*b* and the lower protruding tube 41*d*, both of their functions is provided by a middle protruding tube 41*e* in the second embodiment. Thus, a lean bracket 49 attaches an upper fulcrum portion 43*a*, the middle protruding tube 41*e*, a lower fulcrum portion 44*a*, and the lean brake mechanism 50 collectively to the lean base 41.

As thus far described, the leaning vehicle 1 according to any of the foregoing embodiments includes the vehicle body 2, the left front wheel 31L, the right front wheel 31R, the steering rod 26, the suspension 10, and the first steering part 23, the second steering part 25, and the pantograph mechanism 24. The left front wheel 31L is positioned on the first side (left side) in the vehicle width direction. The right front wheel 31R is positioned on the second side (right side) opposite to the first side in the vehicle width direction. The steering rod 26, in response to receiving a rotational steering force, pushes and pulls the left front wheel 31L and the right front wheel 31R in the vehicle width direction, to change an actual steering angle. The suspension 10 connects front wheel side to the vehicle body side and reduces vibration transmitted from the road surface to the vehicle body 2 via the left front wheel 31L or the right front wheel 31R. The first steering part 23 is disposed the vehicle body side respect to the suspension 10 and transmits rotational steering force by a driver. The second steering part 25 is disposed the front wheel side respect to the suspension 10 and transmits the rotational steering force to the steering rod 26. The pantograph mechanism 24 is disposed separately from the suspension 10, transmits the rotational steering force from the first steering part 23 to the second steering part 25, and maintains state of transmission of the rotational steering force by deforming in accordance with changes in relative positions of the first steering part 23 and the second steering part 25.

Accordingly, a rotational steering force can be transmitted between a vehicle body side and a front wheel side respect to a suspension 10.

In the leaning vehicle 1 according to any of the foregoing embodiments, the suspension 10 includes the tubular body 10*a*, the sliding body 10*b*, and the spring 10*c*. The sliding body 10*b* is inserted into the tubular body 10*a* and slidable relative to the tubular body 10*a*. The spring 10*c* extends or retracts by sliding the sliding body 10*b*, and a position of the axis of the spring 10*c* and the position of an axis of the tubular body 10*a* is same. One of the first steering part 23 and the second steering part 25 vibrates integrally with the tubular body 10*a*. The other of the first steering part 23 and the second steering part 25 vibrates integrally with the sliding body 10*b*.

Accordingly, the rotational steering force can be transmitted by the pantograph mechanism 24 that is separate from the tubular-shaped suspension 10.

In the leaning vehicle 1 according to any of the foregoing embodiments, the pantograph mechanism 24 includes a first link portion 24*a* and a second link portion 24*b*. The first link portion 24*a* is connected to the first steering part 23. The second link portion 24*b* is rotatably connected to both of the first link portion 24*a* and the second steering part 25.

This allows the pantograph mechanism 24 to function with a simple configuration.

The leaning vehicle 1 according to any of the foregoing embodiments includes the steering handle 7 and the transmission arm 22. The transmission arm 22 transmits a rotational steering force applied to the steering handle 7 to the first steering part 23. The first rotation axis 23*c* of the first steering part 23 is positioned forward of the steering rotation axis 7*a* of the steering handle 7.

This allows the caster angle to be reduced while maintaining the space between the front wheels and the vehicle body 2.

The leaning vehicle 1 according to any of the foregoing embodiments includes the lean mechanism 42 that causes the left front wheel 31L and the right front wheel 31R to lean about the front-rear direction as a rotation center when the vehicle body 2 leans about the front-rear direction as a rotation center. The lean mechanism 42 is attached to the front wheel side respect to the suspension 10.

Accordingly, since the lean mechanism 42 can be disposed near the front wheels, a connection configuration of the front wheels and the lean mechanism 42 can be simple.

The leaning vehicle 1 according to any of the foregoing embodiments includes the lean mechanism 42 is positioned so as to overlap the left front wheel 31L and the right front wheel 31R in the side view.

Accordingly, since the lean mechanism 42 that is heavy parts can be positioned relatively low, the leaning vehicle 1 can be stabilized.

In the leaning vehicle 1 according to any of the foregoing embodiments, the first rotation axis 23*c* of the first steering part 23 and the second rotation axis 25*c* of the second steering part 25 are coincident.

Accordingly, a distance of the maneuvering angle of the steering handle 7 side and the actual steering angle of the front wheels is hardly generated.

In the leaning vehicle 1 according to any of the foregoing embodiments, the steering rod 26 is independently changeable from the center of the shaft length to the first side in the vehicle width direction and from the center of the shaft length to the second side in the vehicle width direction.

Accordingly, the toe angle can be adjusted.

While some preferred embodiments of the present invention have been described above, the configurations described above may be modified, for example, as follows.

Features of the first and second embodiments described above may be combined in appropriate manners. For example, the number of tubular suspensions, the lean mechanism 42, or the like, illustrated in the second embodiment may be applicable to the first embodiment. The same is true for other features.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride. In addition, the present invention can be applicable to vehicles except leaning vehicles.

REFERENCE SIGNS LIST 1 leaning vehicle (vehicle)
2 vehicle body
7 steering handle 10 suspension
23 first steering part
24 pantograph mechanism
25 second steering part
31L left front wheel (first front wheel)
31R right front wheel (second front wheel)
32L left wheel
32R right wheel
42 lean mechanism
50 lean brake mechanism

The invention claimed is:

1. A vehicle, comprising:
a vehicle body;
a first front wheel positioned on a first side in a vehicle width direction;
a second front wheel positioned on a second side opposite to the first side in the vehicle width direction;
a steering rod that, in response to receiving a rotational steering force, pushes and pulls the first front wheel and the second front wheel in the vehicle width direction, to change an actual steering angle;
a suspension configured to connect a front wheel side to a vehicle body side and reduce vibration transmitted from a road surface to the vehicle body, the suspension being common for the first front wheel and the second front wheel to absorb the vibration transmitted from the road surface through the first front wheel and the second front wheel collectively;
a first steering part supported by the vehicle body and disposed on the vehicle body side with respect to the suspension and transmits the rotational steering force by a driver;
a second steering part supported by a part from an axle that moves vertically with the first and second front wheels and disposed on the front wheel side with respect to the suspension and transmits the rotational steering force to the steering rod; and
a deformation transmitter disposed separately from the suspension, transmits the rotational steering force from the first steering part to the second steering part, and maintains state of transmission of the rotational steering force by deforming in accordance with changes in relative positions of the first steering part and the second steering part.

2. The vehicle according to claim 1, wherein the suspension includes:
a tubular body,
a sliding body configured to be inserted into the tubular body and slidable relative to the tubular body, and
a spring extending or retracting by sliding the sliding body, a position of an axis of the spring and a position of an axis of the tubular body being the same,
wherein one of the first steering part and the second steering part vibrates integrally with the tubular body, and
wherein the other of the first steering part and the second steering part vibrates integrally with the sliding body.

3. The vehicle according to claim 1, wherein the deformation transmitter includes:
a first link portion connected to the first steering part, and
a second link portion rotatably connected to both of the first link portion and the second steering part,
wherein the deformation transmitter is a pantograph mechanism including the first link portion and the second link portion, and
wherein the pantograph mechanism protrudes on an opposite side of the suspension when the pantograph mechanism become short.

4. The vehicle according to claim 1, further comprising:
a steering handle, and
a rotational transmitter transmitting the rotational steering force applied to the steering handle to the first steering part,
wherein a rotation axis of the first steering part is positioned forward of a rotation axis of the steering handle, and
wherein the suspension is arranged forward of the rotation axis of the first steering part in a front-rear direction.

5. The vehicle according to claim 1, further comprising:
a lean mechanism configured to cause the first front wheel and the second front wheel to lean about a front-rear direction as a rotation center when the vehicle body leans about the front-rear direction as the rotation center,
wherein the lean mechanism is attached to the vehicle at a position forward from the suspension in the front-rear direction, and
wherein the lean mechanism is arranged lower than the suspension.

6. The vehicle according to claim 5, wherein the lean mechanism is positioned so as to overlap the first front wheel and the second front wheel in a side view.

7. The vehicle according to claim 1, wherein a rotation axis of the first steering part and a rotation axis of the second steering part are coincident.

8. The vehicle according to claim 1, wherein the steering rod is independently changeable from a center of a shaft length to the first side in the vehicle width direction and from the center of the shaft length to the second side in the vehicle width direction.

9. The vehicle according to claim 1,
wherein the deformation transmitter includes:
a first link portion connected to the first steering part, and
a second link portion rotatably connected to both of the first link portion and the second steering part,
wherein the deformation transmitter is a pantograph mechanism including the first link portion and the second link portion, and
wherein the pantograph mechanism protrudes on an opposite side of the suspension when the pantograph mechanism become short.

10. The vehicle according to claim 1, wherein the suspension is a front fork type and at least a part of the suspension is arranged in a space in between a front part of the vehicle body and the first front wheel in a side view.

11. The vehicle according to claim 1, wherein the suspension includes:
a tubular body;
a sliding body inserted into the tubular body and slidable relative to the tubular body; and
a spring that extends or retracts by sliding the sliding body,
wherein an axis of the spring and an axis of the tubular body are concentric, and
wherein the tubular body is fixed to the vehicle body to prevent movement of the tubular body relative to the vehicle body.

12. The vehicle according to claim 1, wherein the suspension includes an upper coupling member and a lower coupling member, the second steering part includes a suspension attaching portion, and the suspension attaching portion is attached to the lower coupling member via a lower coupling base.

13. The vehicle according to claim 12, wherein the suspension includes a plurality of tubular suspensions, each of the tubular suspensions coupled to the upper coupling member and the lower coupling member.

14. The vehicle according to claim 12, wherein the suspension includes a plurality of tubular suspensions, each of the tubular suspensions coupled to the upper coupling member and a front frame disposed in a front portion of the vehicle body.

15. A vehicle, comprising:
a vehicle body;
a first front wheel positioned on a first side in a vehicle width direction;
a second front wheel positioned on a second side opposite to the first side in the vehicle width direction;
a steering rod that, in response to receiving a rotational steering force, pushes and pulls the first front wheel and the second front wheel in the vehicle width direction, to change an actual steering angle;
a suspension configured to connect a front wheel side to a vehicle body side and reduce vibration transmitted from a road surface to the vehicle body via the first front wheel or the second front wheel;
a first steering part disposed on the vehicle body side with respect to the suspension and transmits the rotational steering force by a driver;
a second steering part disposed on the front wheel side with respect to the suspension and transmits the rotational steering force to the steering rod;
a deformation transmitter disposed separately from the suspension, transmits the rotational steering force from the first steering part to the second steering part, and maintains state of transmission of the rotational steering force by deforming in accordance with changes in relative positions of the first steering part and the second steering part;
a coupling part for coupling the first front wheel to the second front wheel; and
a vehicle body frame having a front part positioned in front of a steering handle in a front-rear direction,
wherein the suspension connects the coupling part to the front part of the vehicle body frame.

16. The vehicle according to claim 15, wherein the suspension is positioned forward of a rotation axis of the steering handle in the front-rear direction.

17. A vehicle, comprising:
a vehicle body;
a first front wheel positioned on a first side in a vehicle width direction;
a second front wheel positioned on a second side opposite to the first side in the vehicle width direction;
a steering rod that, in response to receiving a rotational steering force, pushes and pulls the first front wheel and the second front wheel in the vehicle width direction, to change an actual steering angle;
a suspension configured to connect a front wheel side to a vehicle body side and reduce vibration transmitted from a road surface to the vehicle body via the first front wheel or the second front wheel;
a first steering part disposed on the vehicle body side with respect to the suspension and transmits the rotational steering force by a driver;
a second steering part disposed on the front wheel side with respect to the suspension and transmits the rotational steering force to the steering rod;
a deformation transmitter disposed separately from the suspension, transmits the rotational steering force from the first steering part to the second steering part, and maintains state of transmission of the rotational steering force by deforming in accordance with changes in relative positions of the first steering part and the second steering part; and
a lean mechanism configured to cause the first front wheel and the second front wheel to lean about a front-rear direction as a rotation center when the vehicle body leans about the front-rear direction as the rotation center,
wherein the lean mechanism is attached to the vehicle at a position forward from the suspension in the front-rear direction, and
wherein the lean mechanism is arranged lower than the suspension.

* * * * *